(12) United States Patent
Noguchi et al.

(10) Patent No.: US 8,329,293 B2
(45) Date of Patent: Dec. 11, 2012

(54) CARBON FIBER COMPOSITE MATERIAL

(75) Inventors: Toru Noguchi, Ueda (JP); Akira Magario, Ueda (JP); Morinobu Endo, Suzaka (JP)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 766 days.

(21) Appl. No.: 11/785,875

(22) Filed: Apr. 20, 2007

(65) Prior Publication Data
US 2010/0009183 A1 Jan. 14, 2010

(30) Foreign Application Priority Data

Apr. 28, 2006 (JP) .................... 2006-125971

(51) Int. Cl.
*D02G 3/00* (2006.01)
*D04H 1/00* (2006.01)
(52) U.S. Cl. ............... 428/401; 428/292.1; 428/364; 428/367
(58) Field of Classification Search .................. None
See application file for complete search history.

(56) References Cited

U.S. PATENT DOCUMENTS

| | | |
|---|---|---|
| 3,943,090 A | 3/1976 | Enever |
| 5,433,906 A | 7/1995 | Dasch et al. |
| 5,912,288 A | 6/1999 | Nishimoto et al. |
| 6,045,898 A | 4/2000 | Kishi et al. |
| 6,489,025 B2 | 12/2002 | Moritat et al. |
| 6,699,582 B2 | 3/2004 | Morita et al. |
| 6,706,793 B2 | 3/2004 | Abu-Isa et al. |
| 6,998,176 B2 | 2/2006 | Morita et al. |
| 7,927,169 B2* | 4/2011 | Noguchi et al. ............ 445/51 |
| 2001/0016254 A1 | 8/2001 | Mizuguchi et al. |
| 2002/0015845 A1 | 2/2002 | Morita et al. |
| 2003/0039828 A1 | 2/2003 | Morita et al. |
| 2003/0157333 A1 | 8/2003 | Ren et al. |
| 2004/0131848 A1 | 7/2004 | Morita et al. |
| 2004/0241440 A1* | 12/2004 | Noguchi et al. ............ 428/364 |
| 2005/0075443 A1 | 4/2005 | Noguchi et al. |
| 2005/0171269 A1 | 8/2005 | Hu et al. |
| 2005/0191490 A1 | 9/2005 | Ton-That et al. |
| 2006/0062986 A1 | 3/2006 | Magario et al. |
| 2006/0079627 A1 | 4/2006 | Noguchi et al. |

(Continued)

FOREIGN PATENT DOCUMENTS

EP 0 205 856 A2 12/1986
(Continued)

OTHER PUBLICATIONS

U.S. Appl. No. 11/385,670, filed in the name of Toru Noguchi et al.
(Continued)

*Primary Examiner* — Camie Thompson
(74) *Attorney, Agent, or Firm* — Oliff & Berridge, PLC

(57) ABSTRACT

A carbon fiber composite material having an elastomer and vapor-grown carbon fibers dispersed in the elastomer. The vapor-grown carbon fibers are rigid fibers having an average diameter of 20 to 200 nm, an average length of 5 to 20 micrometers, and an average value of bending indices defined by the following expression (1) of 5 to 15, Bending index=$Lx \div D$ (1)

Lx: length of linear portion of the vapor-grown carbon fiber, and
D: diameter of the vapor-grown carbon fiber.

The carbon fiber composite material has a dynamic modulus of elasticity (E') at 150° C. of 30 MPa or more and an elongation at break (EB) of 140% or more.

6 Claims, 10 Drawing Sheets

U.S. PATENT DOCUMENTS

| | | |
|---|---|---|
| 2006/0083919 A1 | 4/2006 | Morita et al. |
| 2006/0214560 A1 | 9/2006 | Noguchi et al. |
| 2006/0286361 A1 | 12/2006 | Yonetake |
| 2007/0100058 A1 | 5/2007 | Noguchi et al. |
| 2007/0112124 A1 | 5/2007 | Noguchi et al. |
| 2007/0167556 A1 | 7/2007 | Noguchi et al. |
| 2008/0132635 A1 | 6/2008 | Noguchi et al. |
| 2008/0167417 A1* | 7/2008 | Noguchi et al. ............... 524/496 |
| 2008/0226537 A1 | 9/2008 | Morita et al. |
| 2008/0261116 A1 | 10/2008 | Burton et al. |
| 2009/0104386 A1 | 4/2009 | Barrera et al. |
| 2010/0286309 A1 | 11/2010 | Noguchi et al. |

FOREIGN PATENT DOCUMENTS

| | | |
|---|---|---|
| EP | 1 191 131 A1 | 3/2002 |
| EP | 1 275 759 A1 | 1/2003 |
| EP | 1 466 940 A1 | 10/2004 |
| EP | 1466940 A1 | 10/2004 |
| EP | 1 512 717 A1 | 3/2005 |
| EP | 1705211 | 9/2006 |
| EP | 1 792 935 A1 | 6/2007 |
| JP | A 4-185631 | 7/1992 |
| JP | A-5-84865 | 4/1993 |
| JP | A-2001-223494 | 8/2001 |
| JP | A-2003-12939 | 1/2003 |
| JP | A 2004-331929 | 11/2004 |
| JP | A-2004-338327 | 12/2004 |
| JP | A-2004-360160 | 12/2004 |
| JP | A 2005-0012181 | 1/2005 |
| JP | A-2005-015339 | 1/2005 |
| JP | A-2005-068386 | 3/2005 |
| JP | A 2005-97525 | 4/2005 |
| JP | A-2006-89710 | 4/2006 |
| JP | A-2006-097006 | 4/2006 |
| JP | A-2006-198393 | 8/2006 |
| JP | A-2007-154150 | 6/2007 |
| KR | A 2003-0036887 | 5/2003 |
| KR | 10-2004-0087965 A | 10/2004 |
| WO | WO 00/64668 A1 | 11/2000 |
| WO | WO 01/77423 A1 | 10/2001 |
| WO | WO 03/014441 A1 | 2/2003 |
| WO | WO 03/080513 A2 | 10/2003 |

OTHER PUBLICATIONS

U.S. Appl. No. 11/475,032, filed in the name of Toru Noguchi et al.
U.S. Appl. No. 11/475,033, filed in the name of Toru Noguchi et al.
U.S. Appl. No. 11/594,933, filed in the name of Toru Noguchi et al.
U.S. Appl. No. 11/785,881, filed in the name of Toru Noguchi et al.

Baek et al., "Covalent Modification of Vapour-Grown Carbon Nanofibers via Direct Friedel-Crafts Acylation in Polyphosphoric Acid," Journal of Materials Chemistry, DOI: 10.1039/b401401d. Available online at http://www.rsc.org/ej/JM/2004/B401401D/, May 19, 2004.

Pyrograff III Product Website. Available online at: www.apsci.com/ppi-pyro3.html, 2001.

Hwang et al., "Artificial Intelligence Heat Absorbing/Radiating Engineering Plastic," Database WPI Week 200414, Derwent Publications Ltd., XP-002430929, 2003.

Liu et al., "Rubbery and Glassy Epoxy Resins Reinforced with Carbon Nanotubes," Composites Science and Technology, vol. 65, pp. 1861-1868, Sep. 2005.

Epikote Resin 862 Product Bulletin, Resolution Performance Products, SC:1183-2, pp. 1-10, Sep. 2002.

Epikote Resin 828 Starting Formulation No. 8024, Resolution Performance Products, SC:1547-01, pp. 1-3, Nov. 2001.

Nov. 28, 2008 Office Action issued in U.S. Appl. No. 11/785,881.
Dec. 24, 2008 Office Action issued in U.S. Appl. No. 11/785,881.
Jul. 10, 2009 Office Action issued in U.S. Appl. No. 11/785,881.
Dec. 16, 2009 Office Action issued in U.S. Appl. No. 11/785,881.
Jun. 25, 2010 Office Action issued in U.S. Appl. No. 11/785,881.
Office Action dated Sep. 2, 2009 in U.S. Appl. No. 12/326,490, filed Dec. 2, 2008.
Office Action dated Apr. 28, 2010 in U.S. Appl. No. 12/326,490, filed Dec. 2, 2008.
Jan. 18, 2011, Office Action issued in U.S. Appl. No. 12/326,490.
Jun. 22, 2011 Notification of Reasons issued in Japanese Application No. 2007-155078 with English-language translation.
U.S. Appl. No. 11/987,254 filed Nov. 28, 2007 in the name of Toru Noguchi et al.
U.S. Appl. No. 12/327,396 filed Dec. 3, 2008 in the name of Toru Noguchi et al.
U.S. Appl. No. 12/326,509 filed Dec. 2, 2008 in the name of Toru Noguchi et al.
U.S. Appl. No. 12/326,490 filed Dec. 2, 2008 in the name of Toru Noguchi et al.
Jul. 27, 2011 Notification of Reasons for Refusal issued in Japanese Application No. 2008-161922 with English-language translation.
Gary G. Tibbetts et al., "A review of the fabrication and properties of vapor-grown carbon nanofiber/polymer composites," ScienceDirect, Composites Science and Technology, 67, 2007, pp. 1709-1718.
Jun. 27, 2012 Supplementary European Search Report issued in 08791047.7.
Jul. 5, 2012 European Examination Report issued in 08791047.7.
Aug. 30, 2012 Korean Office Action issued in Korean Patent Application No. 10-2011-7003075 (with English-language Translation).

* cited by examiner

CARBON FIBER COMPOSITE MATERIAL

Japanese Patent Application No. 2006-125971, filed on Apr. 28, 2006, is hereby incorporated by reference in its entirety.

BACKGROUND OF THE INVENTION

The present invention relates to a carbon fiber composite material.

A composite material using carbon fibers, carbon black, graphite, carbon nanofibers, or the like has attracted attention. Such a composite material is expected to exhibit improved electric conductivity, heat transfer properties, mechanical strength, and the like, due to incorporation of the carbon material such as carbon nanofibers.

However, the carbon nanofibers generally exhibit low wettability (affinity) with a matrix material of the composite material, and exhibit low dispersibility in the matrix material. In particular, since the carbon nanofibers have strong aggregating properties, it is very difficult to uniformly disperse the carbon nanofibers in the matrix of the composite material.

The inventors of the invention have proposed a carbon fiber composite material in which carbon nanofibers are uniformly dispersed in an elastomer (see JP-A-2005-97525, for example).

SUMMARY

According to a first aspect of the invention, there is provided a carbon fiber composite material having an elastomer and vapor-grown carbon fibers dispersed in the elastomer, the vapor-grown carbon fibers being rigid fibers having an average diameter of 20 to 200 nm, an average length of 5 to 20 micrometers, and an average value of bending indices defined by the following expression (1) of 5 to 15, $$\text{Bending index} = Lx \div D \qquad (1)$$

Lx: length of linear portion of the vapor-grown carbon fiber, and

D: diameter of the vapor-grown carbon fiber, and the carbon fiber composite material having a dynamic modulus of elasticity (E') at 150° C. of 30 MPa or more and an elongation at break (EB) of 140% or more.

According to a second aspect of the invention, there is provided a carbon fiber composite material having an elastomer and vapor-grown carbon fibers dispersed in the elastomer, the vapor-grown carbon fibers having an average diameter of 20 to 200 nm and an average length of 5 to 20 micrometers, a change rate of a spin-lattice relaxation time (T1') of the carbon fiber composite material with respect to a spin-lattice relaxation time (T1) of the elastomer, measured at 150° C. by an inversion recovery method using a pulsed nuclear magnetic resonance (NMR) technique, being ±15% or less, and the carbon fiber composite material having a dynamic modulus of elasticity (E') at 150° C. of 30 MPa or more and an elongation at break (EB) of 140% or more.

DETAILED DESCRIPTION OF THE EMBODIMENT

Figure 1:
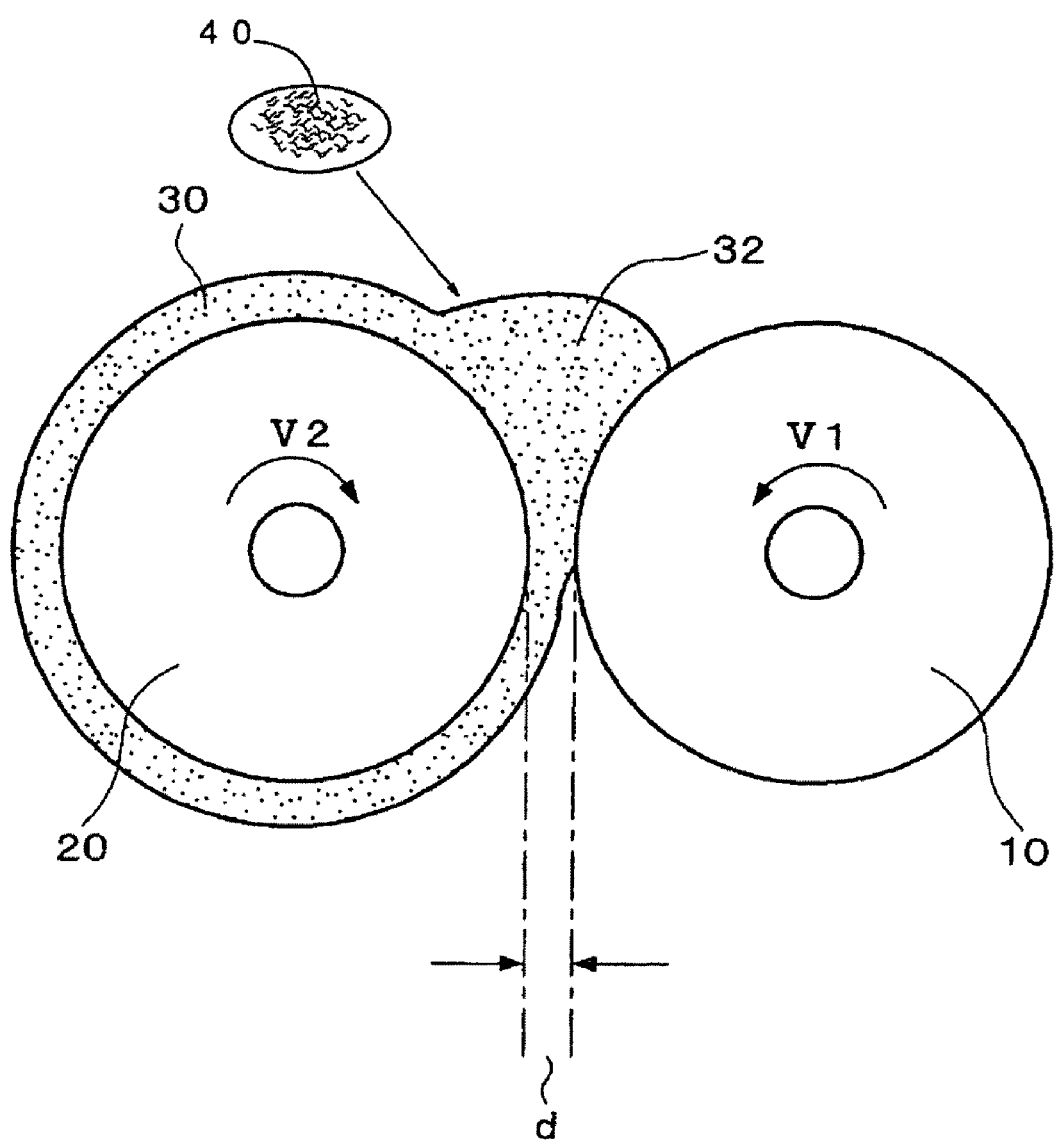
FIG. 1 is a view for schematically illustrating a method of mixing an elastomer and vapor-grown carbon fibers utilizing an open-roll method employed in one embodiment of the invention.

The invention may provide a carbon fiber composite material in which vapor-grown carbon fibers are uniformly dispersed in an elastomer and which exhibits high flexibility and high rigidity.

According to one embodiment of the invention, there is provided a carbon fiber composite material having an elastomer and vapor-grown carbon fibers dispersed in the elastomer, the vapor-grown carbon fibers being rigid fibers having an average diameter of 20 to 200 nm, an average length of 5 to 20 micrometers, and an average value of bending indices defined by the following expression (1) of 5 to 15, $$\text{Bending index} = Lx \div D \qquad (1)$$

Lx: length of linear portion of the vapor-grown carbon fiber, and

D: diameter of the vapor-grown carbon fiber, and the carbon fiber composite material having a dynamic modulus of elasticity (E') at 150° C. of 30 MPa or more and an elongation at break (EB) of 140% or more.

The carbon fiber composite material according to this embodiment can exhibit high rigidity with a dynamic modulus of elasticity of 30 MPa or more by using the rigid vapor-grown carbon fibers while exhibiting high flexibility with an elongation at break of 140% or more.

According to one embodiment of the invention, there is provided a carbon fiber composite material having an elastomer and vapor-grown carbon fibers dispersed in the elastomer, the vapor-grown carbon fibers having an average diameter of 20 to 200 nm and an average length of 5 to 20 micrometers, a change rate of a spin-lattice relaxation time (T1') of the carbon fiber composite material with respect to a spin-lattice relaxation time (T1) of the elastomer, measured at 150° C. by an inversion recovery method using a pulsed nuclear magnetic resonance (NMR) technique, being ±15% or less, and the carbon fiber composite material having a dynamic modulus of elasticity (E') at 150° C. of 30 MPa or more and an elongation at break (EB) of 140% or more.

The spin-lattice relaxation time (T1') (which indicates flexibility) of the carbon fiber composite material according to this embodiment changes to only a small extent from the spin-lattice relaxation time (T1) of the raw material elastomer by using the rigid vapor-grown carbon fibers, whereby the carbon fiber composite material according to this embodiment can maintain high flexibility. Such a carbon fiber composite material can exhibit high rigidity with a dynamic modulus of elasticity of 30 MPa or more while exhibiting high flexibility with an elongation at break of 140% or more.

In the above carbon fiber composite materials, a filling rate of the vapor-grown carbon fibers in the carbon fiber composite material may be 15 to 60 wt %.

According to this configuration, a carbon fiber composite material can be provided which exhibits high flexibility and high rigidity.

In the above carbon fiber composite materials,
the elastomer may have a molecular weight of 5000 to 5,000,000; and
a network component of the elastomer in an uncrosslinked form may have a spin-spin relaxation time (T2$n$), measured at 30° C. by a Hahn-echo method using a pulsed nuclear magnetic resonance (NMR) technique, of 100 to 3000 microseconds.

If the raw material elastomer has a molecular weight and a spin-spin relaxation time (T2$n$) within the above ranges, the vapor-grown carbon fibers can be uniformly dispersed in the elastomer due to the moderate elasticity of the elastomer.

In the above carbon fiber composite materials,
the dynamic modulus of elasticity (E') of the sheet-shaped carbon fiber composite material extruded from a mixer in a first direction may include a first dynamic modulus of elasticity (E'(L)) in the first direction and a second dynamic modulus of elasticity (E'(T)) in a direction which is perpendicular to the first direction and is a width direction of the carbon fiber composite material; and
an orientation ratio (E'(L)/E'(T)) of the first dynamic modulus of elasticity (E'(L)) to the second dynamic modulus of elasticity (E'(T)) may be 2 or less.

According to this configuration, since the fibers are not oriented only in the extrusion direction, even if the rigid vapor-grown carbon fibers are used, the carbon fiber composite material can also be employed as a rubber member which, desirably, exhibits no anisotropy, such as a piston seal of a vehicular disk brake.

The elastomer according to the invention may be a rubber elastomer or a thermoplastic elastomer. When using a rubber elastomer, it does not matter whether the elastomer is crosslinked or not.

Some embodiments of the invention will be described in detail below, with reference to the drawings.

Figure 2:
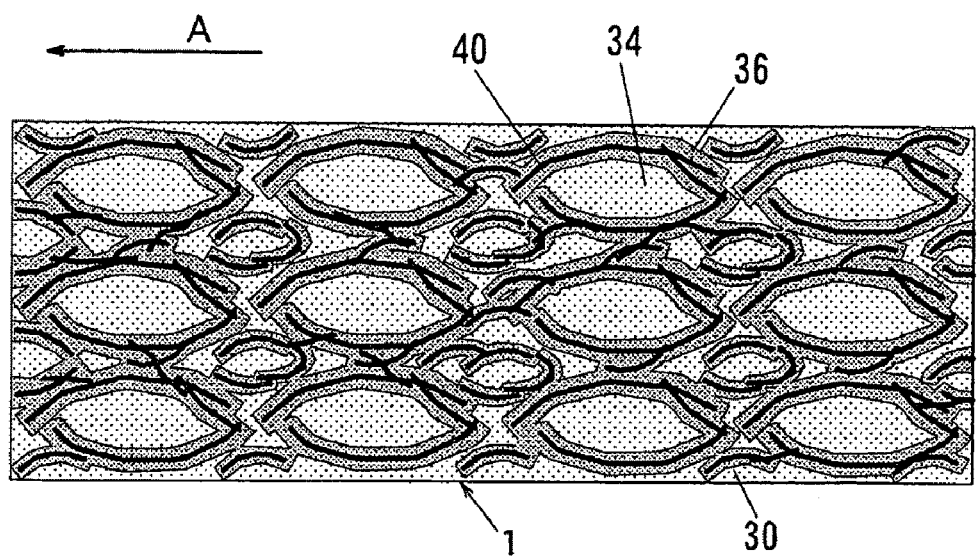
FIG. 2 is a vertical cross-sectional view schematically showing a first mixture according to one embodiment of the invention.
Figure 3:
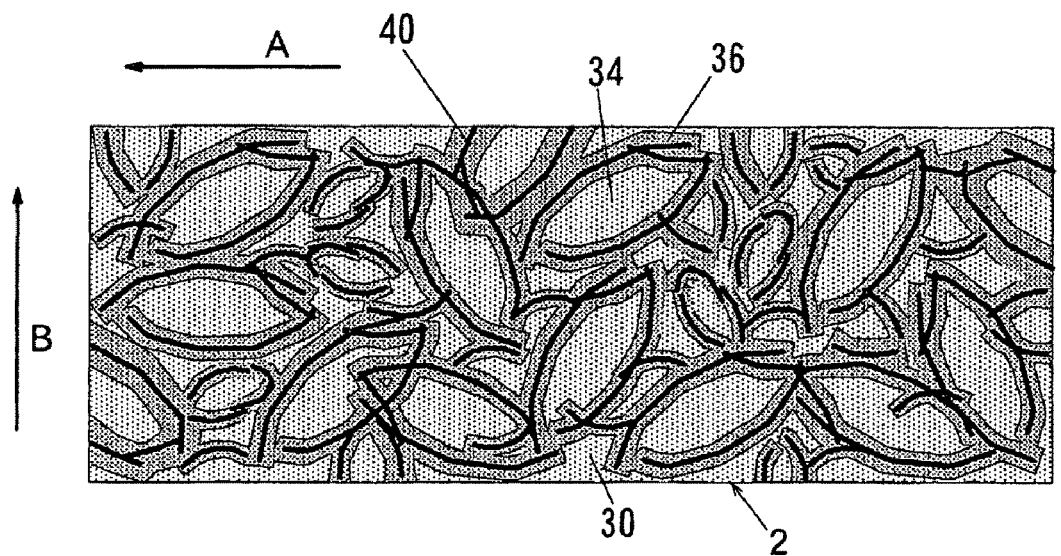
FIG. 3 is a vertical cross-sectional view schematically showing a second mixture according to one embodiment of the invention.

FIG. 1 is a view for schematically illustrating a method of mixing an elastomer and vapor-grown carbon fibers utilizing an open-roll method employed in one embodiment of the invention. FIG. 2 is a vertical cross-sectional view schematically showing a first mixture according to one embodiment of the invention. FIG. 3 is a vertical cross-sectional view schematically showing a second mixture according to one embodiment of the invention.

The elastomer is described below.

The elastomer has a molecular weight of preferably 5000 to 5,000,000, and still more preferably 20,000 to 3,000,000. If the molecular weight of the elastomer is within this range, the elastomer molecules are entangled and linked, whereby the elastomer exhibits excellent elasticity for dispersing the vapor-grown carbon fibers. Since the elastomer exhibits viscosity, the elastomer easily enters the space between the aggregated vapor-grown carbon fibers. Moreover, since the elastomer exhibits elasticity, the vapor-grown carbon fibers can be separated.

The network component of the elastomer in an uncrosslinked form has a spin-spin relaxation time (T2$n$/30° C.), measured at 30° C. by a Hahn-echo method using a pulsed nuclear magnetic resonance (NMR) technique, of preferably 100 to 3000 microseconds, and still more preferably 200 to 1000 microseconds. If the elastomer has a spin-spin relaxation time (T2$n$/30° C.) within the above range, the elastomer is flexible and has a sufficiently high molecular mobility. That is, the elastomer exhibits appropriate elasticity for dispersing the vapor-grown carbon fibers. Moreover, since the elastomer exhibits viscosity, the elastomer can easily enter the space between the vapor-grown carbon fibers due to a high degree of molecular motion when mixing the elastomer and the vapor-grown carbon fibers.

The network component of the elastomer in a crosslinked form preferably has a spin-spin relaxation time (T2$n$), measured at 30° C. by the Hahn-echo method using the pulsed NMR technique, of 100 to 2000 microseconds. The reasons therefor are the same as those described for the uncrosslinked form. Specifically, when crosslinking an uncrosslinked form which satisfies the above conditions using the production method according to this embodiment, the spin-spin relaxation time (T2$n$) of the resulting crosslinked form almost falls within the above range.

The spin-spin relaxation time obtained by the Hahn-echo method using the pulsed NMR technique is a measure indicating the molecular mobility of a substance. In more detail, when measuring the spin-spin relaxation time of the elastomer by the Hahn-echo method using the pulsed NMR technique, a first component having a shorter first spin-spin relaxation time (T2$n$) and a second component having a longer second spin-spin relaxation time (T2$nn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method for the pulsed NMR technique, a solid-echo method, a Carr-Purcell-Meiboom-Gill (CPMG) method, or a 90-degree pulse method may be applied instead of the Hahn-echo method. However, since the carbon fiber composite material according to this embodiment has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to the vapor-grown carbon fiber, particularly to a terminal radical of the vapor-grown carbon fiber, or the elastomer has properties of readily producing such a radical or group. The unsaturated bond or group may be at least one unsaturated bond or group selected from a double bond, a triple bond, and functional groups such as alpha-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The vapor-grown carbon fiber generally has a structure in which the side surface is formed of a six-membered ring of carbon atoms and the end is closed by a five-membered ring. Since the vapor-grown carbon fiber has a forced structure, defects tend to occur, whereby a radical or a functional group tends to be produced at the defective portions. In this embodiment, since at least one of the main chain, side chain, and terminal chain of the elastomer includes an unsaturated bond or a group having high affinity (reactivity or polarity) to the radical of the vapor-grown carbon fiber, the elastomer and the vapor-grown carbon fiber can be bonded. This allows the vapor-grown carbon fibers to be easily dispersed against the aggregating force of the vapor-grown carbon fibers. When mixing the elastomer and the vapor-grown carbon fibers, free radicals produced due to breakage of the elastomer molecular chain attack the defects of the vapor-grown carbon fibers to produce radicals on the surfaces of the vapor-grown carbon fibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS); or a mixture of these elastomers may be used. In particular, a highly polar elastomer which readily produces free radicals when mixing the elastomer, such as natural rubber (NR) or nitrile rubber (NBR), is preferable. An elastomer having a low polarity, such as ethylene propylene rubber (EPDM), may also be used in the invention, since such an elastomer also produces free radicals when the mixing temperature is adjusted to a relatively high temperature (e.g. 50° C. to 150° C. for EPDM).

The elastomer according to this embodiment may be a rubber elastomer or a thermoplastic elastomer. When using a rubber elastomer, an uncrosslinked elastomer is preferable.

The vapor-grown carbon fibers are described below.

The vapor-grown carbon fibers used in this embodiment are rigid fibers having an average diameter of 20 to 200 nm, preferably 60 to 180 nm, and still more preferably 80 to 160 nm, an average length of 5 to 20 micrometers, and an average bending index of 5 to 15.

The bending index indicates the rigidity of the vapor-grown carbon fibers, and is obtained by measuring the lengths of linear portions and the diameters of a number of vapor-grown carbon fibers photographed using a microscope or the like, and calculating the bending index from the measured values. A bent portion (defect) of a carbon nanofiber including a vapor-grown carbon fiber photographed using an electron microscope appears as a white line which crosses the fiber in the width direction. When the length of the linear portion of the vapor-grown carbon fiber is $Lx$ and the diameter of the vapor-grown carbon fiber is D, the bending index is defined by $Lx \div D$. Therefore, a vapor-grown carbon fiber having a low bending index is bent at a short interval, and a vapor-grown carbon fiber having a high bending index has a long linear portion and is not bent.

The length $Lx$ of the linear portion of the vapor-grown carbon fiber according to this embodiment is measured in a state in which photograph data of the vapor-grown carbon fibers photographed at a magnification of 10,000 to 50,000 is enlarged by a factor of 2 to 10, for example. A bent portion (defect) which crosses the fiber in the width direction can be observed in the enlarged photograph. The distance between the adjacent bent portions (defects) thus observed is measured at multiple points as the length $Lx$ of the linear portion of the vapor-grown carbon fiber.

As examples of nanometer-sized carbon fibers (carbon nanofibers), single-wall carbon nanotubes, multi-wall carbon nanotubes, vapor-grown carbon fibers, and the like can be given. The vapor-grown carbon fiber has a defect in the bent portion and is generally bent in the bent portion. It is estimated that the vapor-grown carbon fiber exhibits low rigidity in the bent portion (defect). When load (strain) is applied to the vapor-grown carbon fiber, the vapor-grown carbon fiber tends to be bent and deformed in the bent portion (defect), whereby the rigidity of the vapor-grown carbon fiber is decreased. The length $Lx$ of the linear portion of the vapor-grown carbon fiber refers to the length of the vapor-grown carbon fiber in which such a defect does not occur. Therefore, it is estimated that the vapor-grown carbon fiber exhibits low rigidity when the vapor-grown carbon fiber has a low bending index. On the other hand, it is estimated that the vapor-grown carbon fiber exhibits high rigidity when the vapor-grown carbon fiber has a high bending index.

Such a rigid vapor-grown carbon fiber may be produced by a vapor-phase growth method. In the vapor-phase growth method, vapor-grown carbon fibers are synthesized by thermally decomposing hydrocarbons such as benzene or toluene in a vapor phase. As specific examples of the vapor-phase growth method, a floating catalyst method, a zeolite-supported catalyst method, and the like can be given. Vapor-grown carbon fibers obtained by the vapor-phase growth method using a metal catalyst are commercially available as VGCF (Vapor-Grown Carbon, Fiber; registered trademark) manufactured by Showa Denko K.K., for example. The vapor-grown carbon fibers may be provided with improved adhesion to and wettability with the elastomer by subjecting the vapor-grown carbon fibers to surface treatment, such as ion-injection treatment, sputter-etching treatment, or plasma treatment, before mixing the vapor-grown carbon fibers with the elastomer.

A method of producing a carbon fiber composite material is described below.

A method of producing a carbon fiber composite material according to one embodiment of the invention may include (a) mixing vapor-grown carbon fibers with an elastomer and dispersing the vapor-grown carbon fibers by applying a shear force to obtain a first mixture, (b) placing pieces of the first mixture one upon another and mixing the pieces to obtain a second mixture in which the vapor-grown carbon fibers are randomly oriented, and (c) molding the second mixture in a mold. Mixing in the steps (a) and (b) may be carried out using a mixer for an open-roll method, an internal mixing method, a multi-screw extrusion kneading method, or the like. This embodiment illustrates an example using an open-roll method as the step of mixing the vapor-grown carbon fibers with the elastomer.

Step (a)

FIG. 1 is a view schematically showing an open-roll method using two rolls. In FIG. 1, a reference numeral 10 indicates a first roll, and a reference numeral 20 indicates a second roll. The first roll 10 and the second roll 20 are disposed at a specific distance d of preferably 1.0 mm or less (e.g.

1.0 mm). In FIG. 1, the first roll 10 and the second roll 20 are rotated in the directions indicated by the arrows. An elastomer 30 is wound around the second roll 20. After the addition of vapor-grown carbon fibers 40 to a bank 32, the first and second rolls 10 and 20 are rotated to mix the elastomer 30 and the vapor-grown carbon fibers 40. The rotational speed of the first roll 10 is 22 rpm, and the rotational speed of the second roll 20 is 20 rpm, for example. After reducing the distance d between the first and second rolls 10 and 20 to preferably 0.1 mm to 0.5 mm (e.g. 0.1 mm), the first and second rolls 10 and 20 are rotated at the above rotational speeds (e.g. roll surface rotational speed ratio is 1.1). This causes a high shear force to be applied to the elastomer 30, whereby the aggregated vapor-grown carbon fibers are separated by the shear force so that the vapor-grown carbon fibers are removed one by one and become dispersed in the elastomer 30. After increasing the roll surface rotational speed ratio to 1.3 (e.g. first roll: 26 rpm/second roll: 20 rpm), the mixture is rolled at a roll distance d (e.g. 0.5 mm) to obtain a sheet-shaped first mixture.

In the step (a), free radicals are produced in the elastomer shorn by the shear force and attack the surfaces of the vapor-grown carbon fibers, whereby the surfaces of the vapor-grown carbon fibers are activated. For example, when using natural rubber (NR) as the elastomer, each natural rubber (NR) molecule is cut while being mixed by the rolls to have a molecular weight lower than the molecular weight before being supplied to the open roll. Since radicals are produced in the cut natural rubber (NR) molecules and attack the surfaces of the vapor-grown carbon fibers during mixing, the surfaces of the vapor-grown carbon fibers are activated.

In the step (a), the elastomer and the vapor-grown carbon fibers are mixed at a relatively low temperature of preferably 0 to 50° C., and still more preferably 5 to 30° C. in order to obtain as high a shear force as possible. When using the open-roll method, it is preferable to set the roll temperature at the above temperature.

Since the elastomer according to this embodiment has the above-described characteristics, specifically, elasticity represented by the molecular configuration (molecular length) and molecular motion, viscosity, and chemical interaction with the vapor-grown carbon fibers, dispersion of the vapor-grown carbon fibers is facilitated. Therefore, a carbon fiber composite material can be obtained in which the vapor-grown carbon fibers exhibit excellent dispersibility and dispersion stability (i.e. dispersed vapor-grown carbon fibers rarely reaggregate). In more detail, when mixing the elastomer and the vapor-grown carbon fibers, the elastomer exhibiting viscosity enters the space between the vapor-grown carbon fibers, and a specific portion of the elastomer bonds to a highly active site of the vapor-grown carbon fiber through chemical interaction. When a high shear force is applied to the mixture of the elastomer having an appropriately long molecular length and high molecular mobility (exhibiting elasticity) and the vapor-grown carbon fibers, the vapor-grown carbon fibers move along with the deformation of the elastomer. The aggregated vapor-grown carbon fibers are separated by the restoring force of the shorn elastomer due to elasticity, and become dispersed in the elastomer. According to this embodiment, when the mixture is extruded through the narrow space between the rolls, the mixture is deformed to have a thickness greater than the roll distance as a result of the restoring force of the elastomer due to elasticity. It is estimated that the above deformation causes the mixture to which a high shear force is applied to flow in a more complicated manner to disperse the vapor-grown carbon fibers in the elastomer. The dispersed vapor-grown carbon fibers are prevented from reaggregating due to chemical interaction with the elastomer, whereby excellent dispersion stability can be obtained.

In the first mixture obtained by the step (a), it is estimated that the vapor-grown carbon fibers are oriented along turbulent flows occurring in the elastomer between the two rolls. FIG. 2 is a vertical cross-sectional view schematically showing a first mixture 1. As shown in FIG. 2, the vapor-grown carbon fibers 40 are oriented in the first mixture 1 along a first direction A (roll rotational direction) in which the mixture is rolled between the rolls and extruded from the open roll mixer. An interfacial phase 36 is formed around the vapor-grown carbon fibers 40. The interfacial phase 36 is considered to be an aggregate of the elastomer molecules formed when the molecular chain of the elastomer 30 is cut during mixing, and free radicals thus produced attack and adhere to the surfaces of the vapor-grown carbon fibers 40. The interfacial phase 36 is considered to be similar to a bound rubber formed around carbon black when mixing an elastomer and carbon black, for example. It is estimated that the interfacial phase 36 covers and protects the vapor-grown carbon fibers 40, and the interfacial phases 36 are linked to form small cells 34 of the elastomer having a nanometer size and enclosed by the interfacial phases 36. It is estimated that the small cells 34 are in the shape of oval spheres which extend along the direction A, and are oriented along the direction A, for example.

In the step (a), the internal mixing method or the multi-screw extrusion kneading method may be used instead of the open-roll method. In other words, it suffices that a shear force sufficient to separate the aggregated vapor-grown carbon fibers and produce radicals by cutting the elastomer molecules be applied to the elastomer in the step (a).

In the step (a), a compounding ingredient usually used when processing an elastomer such as rubber may be added. As the compounding ingredient, a known compounding ingredient may be used. As examples of the compounding ingredient, a crosslinking agent, a vulcanizing agent, a vulcanization accelerator, a vulcanization retarder, a softener, a plasticizer, a curing agent, a reinforcing agent, a filler, an aging preventive, a colorant, and the like can be given.

Step (b)

It is estimated that the vapor-grown carbon fibers in the first mixture obtained by the step (a) are oriented in only one direction. In the step (b), the first mixture is cut into pieces with a specific length, and the pieces are placed one upon another and mixed using a mixer such as an open roll to obtain a second mixture in which the vapor-grown carbon fibers are randomly oriented. The anisotropy of the carbon fiber composite material due to the orientation of the vapor-grown carbon fibers is eliminated by carrying out the step (b).

When carrying out the step (b) using the open-roll method utilized in the step (a), the first mixture is cut into pieces with a specific length, and the pieces are placed one upon another (or the first mixture is folded a number of times) and caused to pass between the first and second rolls 10 and 20 rotating at a very low equal speed a number of times (e.g. three times). The rotational speeds of the first and second rolls 10 and 20 are preferably 22 rpm. The two rolls are rotated at an equal speed. It is preferable to gradually increase the distance d. For example, the distance d is changed from 0.5 mm to about 5 mm.

FIG. 3 is a vertical cross-sectional view schematically showing a second mixture 2. The orientation of the cells 34 in the shape of oval spheres which have been oriented in a specific direction (first direction A) is disordered by arbitrarily placing the pieces of the thin sheet-shaped first mixture one upon another. Therefore, the small cells 34 enclosed by the vapor-grown carbon fibers 40 and the interfacial phases 36 formed around the vapor-grown carbon fibers 40 are randomly oriented, as shown in FIG. 3. The separated cells 34 adhere and are linked by causing the first mixture to pass between the rolls rotating at a very low equal rotational speed. Moreover, air confined between the first mixtures placed one upon another is removed by the step (b).

The resulting second mixture is a carbon fiber composite material in which the vapor-grown carbon fibers are uniformly dispersed in the elastomer and are randomly oriented. The second mixture may be optionally molded into a specific shape in the step (c) described below. In the step (b), a single-screw extruder or the like may be used instead of the above open-roll method.

Step (c)

In the step (c), a mold (e.g. heated at 175° C.) having a specific shape is filled with the second mixture obtained by the step (b). After bumping (degassing operation) the second mixture a number of times at a specific pressure, the second mixture is press-molded to obtain a carbon fiber composite material having a specific shape. When crosslinking the second mixture, a crosslinking agent (e.g. peroxide) is added in advance in the step (a). As the molding method, transfer molding, injection molding, or the like may be employed instead of press molding.

The carbon fiber composite material is described below.

In the carbon fiber composite material according to this embodiment, the vapor-grown carbon fibers are uniformly dispersed in the elastomer as the matrix. The state of the vapor-grown carbon fibers in the elastomer has been described for the second mixture in the step (b). That is, the small cells enclosed by the vapor-grown carbon fibers and the interfacial phases formed around the vapor-grown carbon fibers are randomly oriented.

The size of the cells in the carbon fiber composite material is relatively large in comparison with the case of using multi-wall carbon nanotubes (MWNT) produced by an arc discharge or the like as the nanometer-sized carbon fibers. The reason therefor is estimated as follows. Specifically, since the thick and rigid vapor-grown carbon fibers are used, the number of bent portions is small, whereby small cells cannot be formed, differing from the case of using MWNT. Since the elastomer as the matrix effectively exhibits flexibility in the carbon fiber composite material by forming a number of large cell structures, the carbon fiber composite material exhibits high flexibility. Moreover, since the vapor-grown carbon fibers are thick and rigid, the carbon fiber composite material exhibits high rigidity. It is preferable that the carbon fiber composite material have a dynamic modulus of elasticity (E') at 150° C. of 30 MPa or more and 10 GPa or less and an elongation at break (EB) of 140% or more and 1000% or less.

In order to obtain a carbon fiber composite material exhibiting such a high flexibility and high rigidity, it is preferable to adjust the filling rate of the vapor-grown carbon fibers in the carbon fiber composite material to 15 to 60 wt %. If the filling rate of the vapor-grown carbon fibers in the carbon fiber composite material is less than 15 wt %, the carbon fiber composite material has a dynamic modulus of elasticity (E') at 150° C. of less than 30 MPa. If the filling rate of the vapor-grown carbon fibers in the carbon fiber composite material exceeds 60 wt %, the carbon fiber composite material has an elongation at break (EB) of less than 140%.

Since the vapor-grown carbon fibers are randomly oriented, the carbon fiber composite material has an orientation ratio (E'(L)/E'(T)) of a first dynamic modulus of elasticity (E'(L)) to a second dynamic modulus of elasticity (E'(T)) of 2 or less, i.e. exhibits a low degree of anisotropy. Note that the first dynamic modulus of elasticity (E'(L)) is the dynamic modulus of elasticity (E') in the first direction A of the sheet-shaped carbon fiber composite material extruded from a mixer (open roll in this embodiment) in the first direction A, and the second dynamic modulus of elasticity (E'(T)) is the dynamic modulus of elasticity of the carbon fiber composite material in a direction (second direction B) which is perpendicular to the first direction A and is the width direction of the carbon fiber composite material.

A change rate of the spin-lattice relaxation time (T1') of the carbon fiber composite material with respect to the spin-lattice relaxation time (T1) of the elastomer, measured at 150° C. by an inversion recovery method using the pulsed NMR technique, is ±15% or less. The spin-lattice relaxation time (T1) measured by the inversion recovery method using the pulsed NMR technique is a measure indicating the molecular mobility of a substance together with the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer. Therefore, a small change rate of the spin-lattice relaxation time (T1') with respect to the spin-lattice relaxation time (T1) indicates that flexibility does not change to a large extent before and after mixing the vapor-grown carbon fibers with the elastomer, and the carbon fiber composite material maintains high flexibility equal to that of the raw material elastomer.

Examples 1 to 13 according to the invention and comparative examples 1 to 15 are described below. Note that the invention is not limited to the following examples.

1. Preparation of Sample

Step (a)

(1) 100 phr of an elastomer was supplied to a 6-inch open roll (roll temperature: 10 to 20° C.) and wound around the roll. After the addition of a filler to the elastomer, the components were mixed. The roll distance was set at 1 mm, and the roll rotational speed was set at 22 rpm/20 rpm. The elastomer and the filler are shown in Tables 1 and 2.

(2) After reducing the roll distance to 0.1 mm, the mixture obtained in (1) was supplied to the open roll and tight-milled five times. The roll rotational speed was set at 22 rpm/20 rpm.

(3) After setting the roll distance at 0.5 mm and the roll rotational speed at 26 rpm/20 rpm (roll surface rotational speed ratio: 1.3), the mixture tight-milled in (2) was supplied to the open roll and rolled to obtain a first mixture.

Step (b)

(4) The first mixture obtained in each of Examples 1 to 12 and Comparative Examples 1 to 15 was cut into pieces with a specific length, which were placed one upon another and caused to pass through the open roll at a roll distance of 1 mm and a roll rotational speed of 4 rpm/4 rpm.

(5) The mixture obtained in (4) was cut into pieces with a specific length, which were placed one upon another and caused to pass through the open roll at a roll distance of 2 mm and a roll rotational speed of 4 rpm/4 rpm.

(6) The mixture obtained in (5) was cut into pieces with a specific length, which were placed one upon another and caused to pass through the open roll at a roll distance of 5 mm and a roll rotational speed of 4 rpm/4 rpm to obtain a second mixture.

Step (c)

(7) The sheet-shaped second mixture obtained in (6) and having a thickness of 6 mm (first mixture in Example 13) was placed in a mold having a thickness of 1 mm, and disposed on a press machine heated at 175° C.

(8) Air was removed by five times of bumping at a pressure of 10 MPa, and the mixture was molded into the mold shape.

(9) In Examples 1 to 10, 12, and 13 and Comparative Examples 1 to 15, a peroxide was added in the step (a) as a crosslinking agent, and the mixture was press-molded at a pressure of 10 MPa and a temperature of 175° C. for 20 minutes to obtain a crosslinked carbon fiber composite material sample. In Example 11, a crosslinking agent was not added, and the mixture was press-molded at a pressure of 10 MPa and a temperature of 175° C. for two minutes to obtain an uncrosslinked carbon fiber composite material sample.

In Tables 1 and 2, "NR" used as the raw material elastomer is natural rubber (molecular weight: 3,000,000, T$2n$ (30° C.): 700 microseconds), "EPDM" is ethylene-propylene rubber (molecular weight: 200,000, T$2n$ (30° C.): 520 microseconds), and "E-SBR" is epoxidized styrene-butadiene rubber (molecular weight: 100,000, T$2n$ (30° C.): 860 microseconds). In Tables 1 and 2, "vapor-grown carbon fiber A" indicates vapor-grown carbon fibers having an average diameter of 87 nm and an average length of 10 micrometers, "vapor-grown carbon fiber B" indicates vapor-grown carbon fibers "VGCF" (registered trademark, manufactured by Showa Denko K.K.) having an average diameter of 150 nm (measured value: 156 nm) and an average length of 10 micrometers, "CNT13" indicates multi-wall carbon nanotubes (CVD) (manufactured by ILJIN Nanotech Co., Ltd.) having an average diameter of 13 nm, "CNT120" indicates multi-wall carbon nanotubes (CVD) (manufactured by ILJIN Nanotech Co., Ltd.) having an average diameter of 120 nm, and "HAF" indicates HAF-HS carbon black. In the examples and comparative examples other than Example 11, 2 parts by weight of a peroxide (PO) was added as a crosslinking agent before adding the filler. In Tables 1 and 2, a sample which was not subjected to the step (b) is indicated by "(B)" in the column of the sample preparation method, and a sample subjected to the steps (a) to (c) is indicated by "(A)".

2. Measurement of Average Bending Index of Vapor-Grown Carbon Fibers

Figure 4:
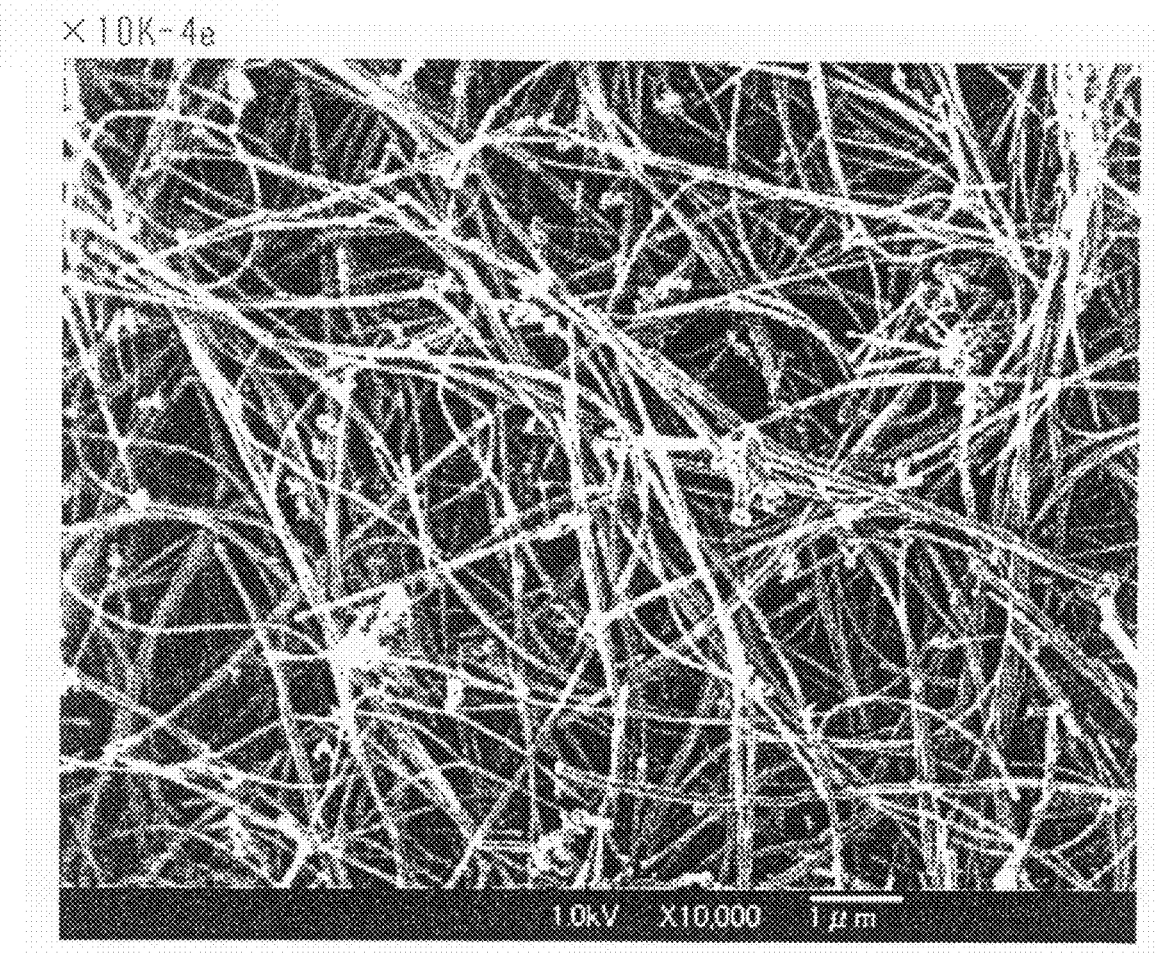
FIG. 4 shows an electron micrograph (magnification: 10,000) of vapor-grown carbon fibers A.
Figure 5:
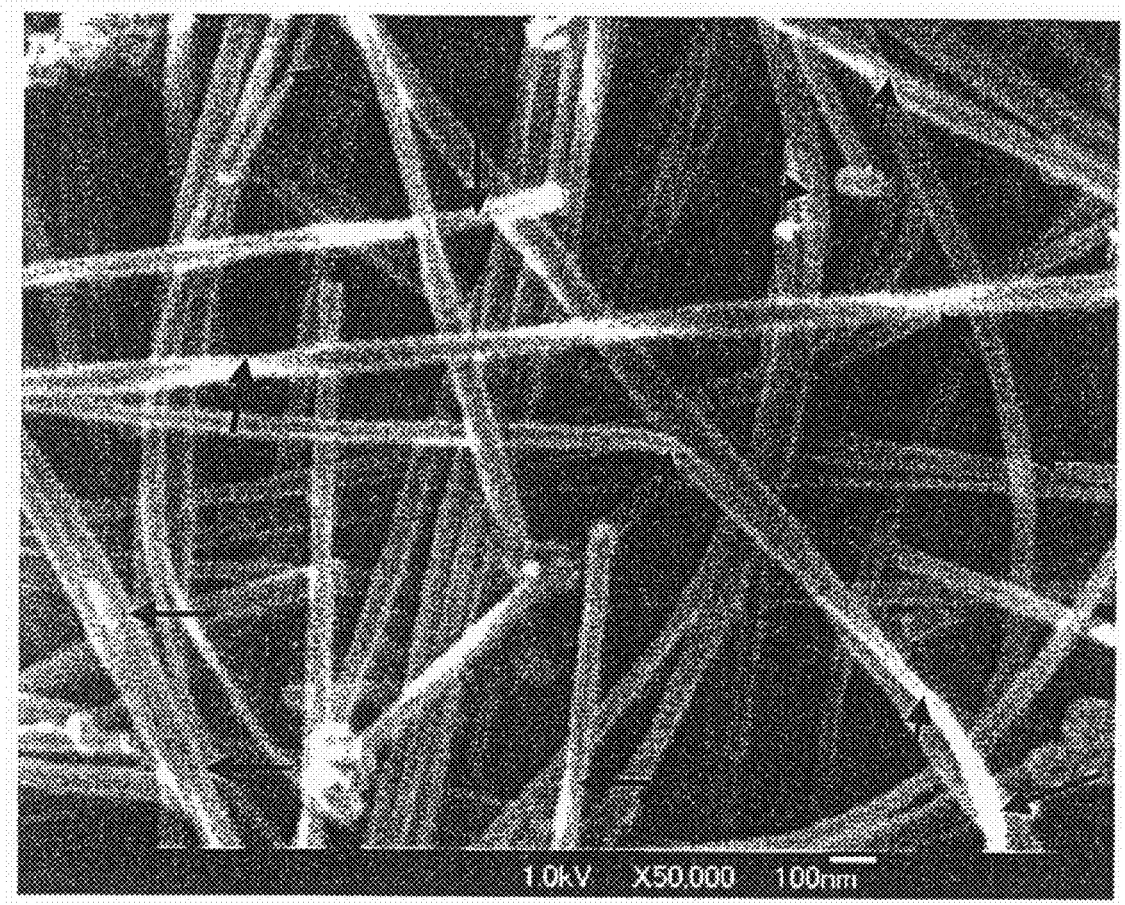
FIG. 5 shows an electron micrograph (magnification: 50,000) of the vapor-grown carbon fibers A.
Figure 6:
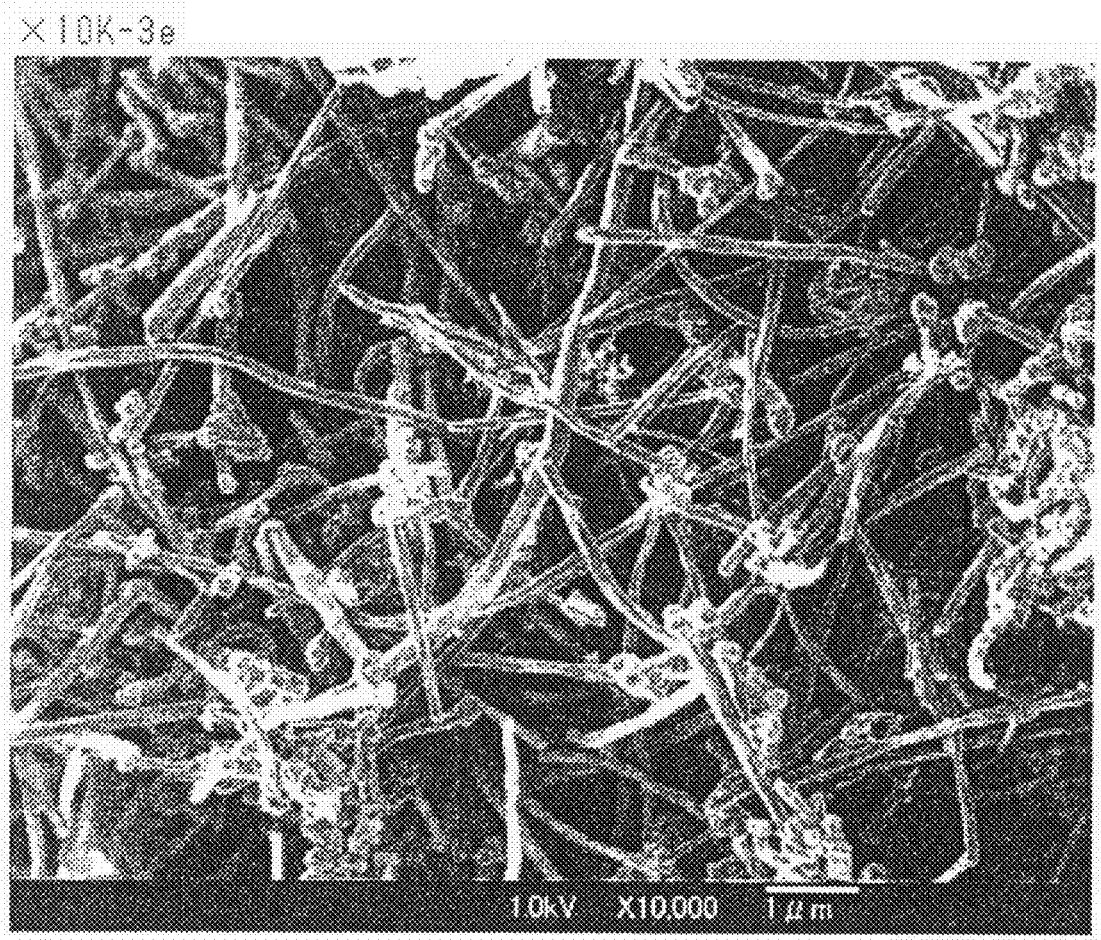
FIG. 6 shows an electron micrograph (magnification: 10,000) of vapor-grown carbon fibers B.
Figure 7:
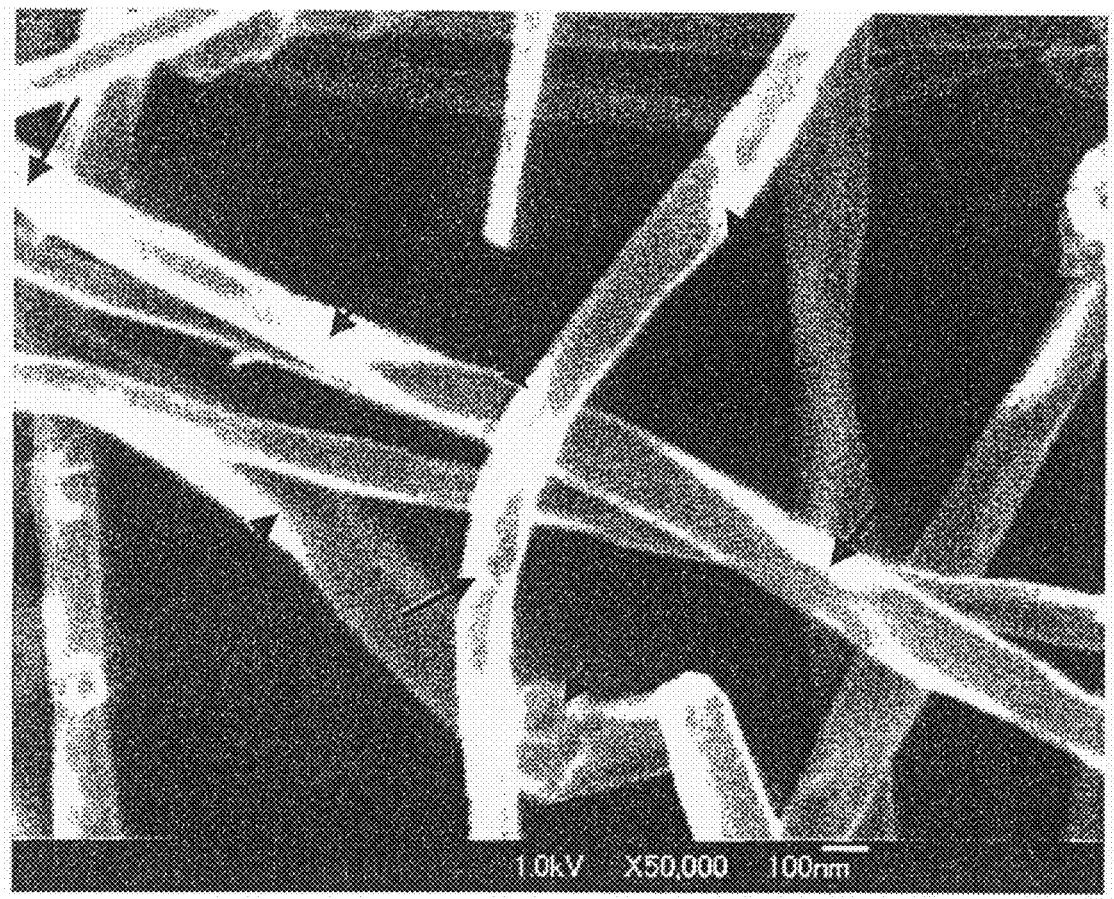
FIG. 7 shows an electron micrograph (magnification: 50,000) of the vapor-grown carbon fibers B.
Figure 8:
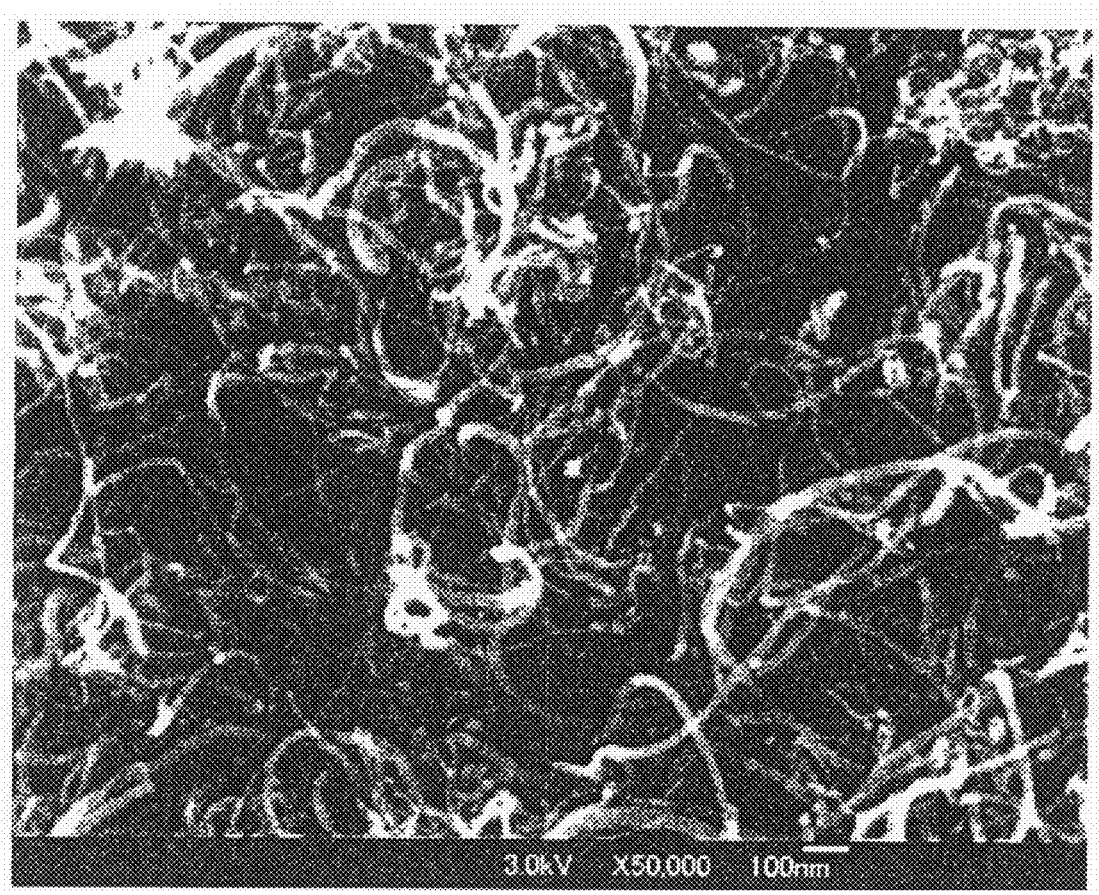
FIG. 8 shows an electron micrograph (magnification: 50,000) of CNT13.
Figure 9:
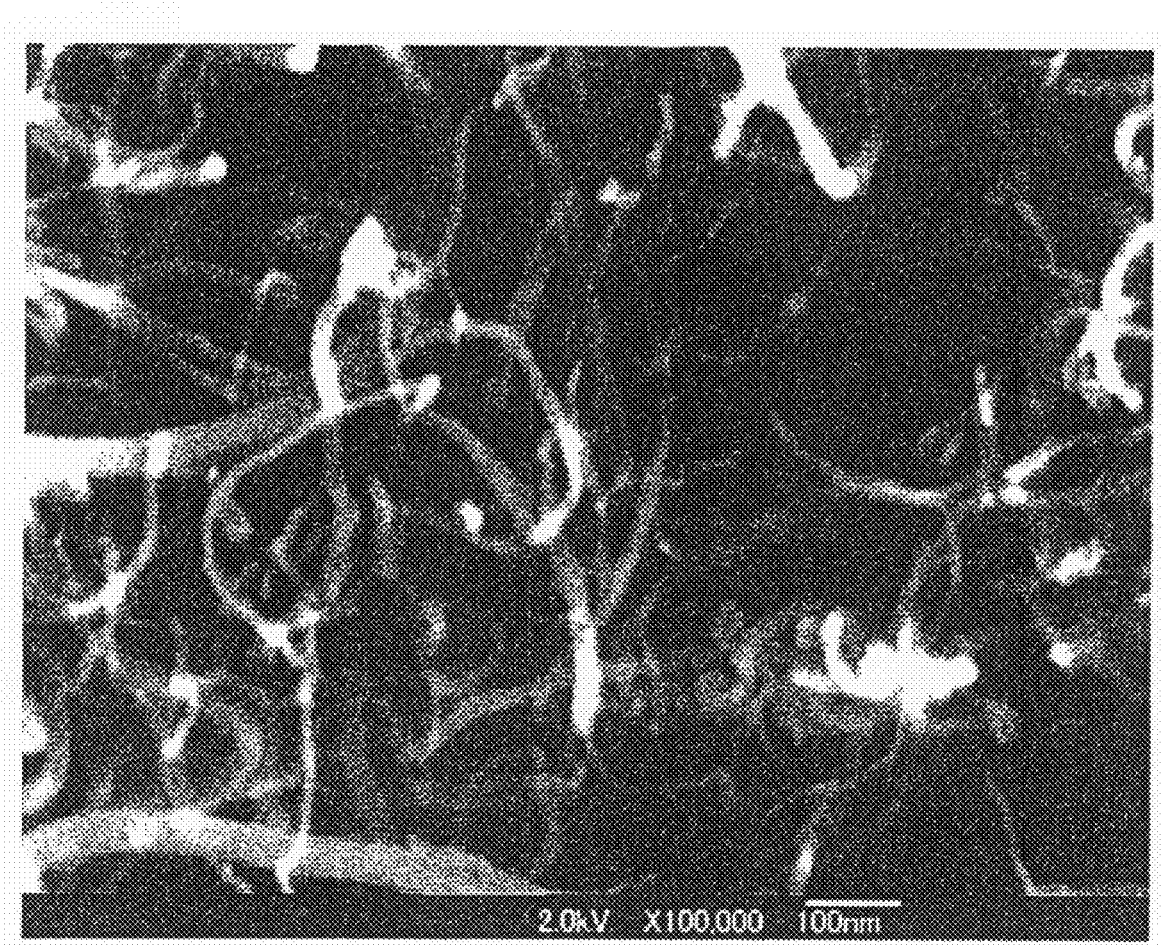
FIG. 9 shows an electron micrograph (magnification: 100,000) of the CNT13.
Figure 10:
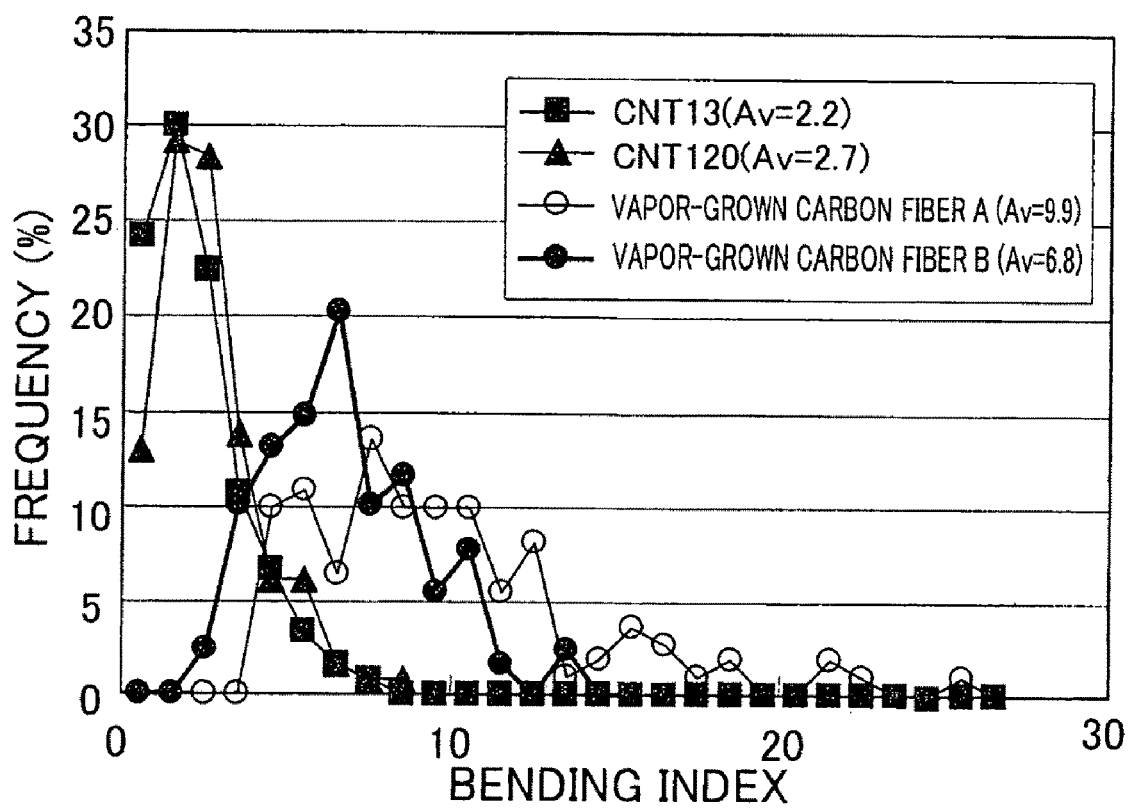
FIG. 10 shows a line graph indicating the distribution of the degree of bending in which the horizontal axis indicates the bending index and the vertical axis indicates the frequency (%).

The vapor-grown carbon fibers and the carbon nanotubes used in Examples 1 to 13 and Comparative Examples 1 to 6 and 15 were photographed using an electron microscope (SEM) at 1.0 kV and a magnification of 10,000 to 100,000, and the length Lx of the linear portion (distance between adjacent defects) of the fiber and the diameter D of the fiber were measured. FIG. 4 shows the electron micrograph of the vapor-grown carbon fibers A photographed at 1.0 kV and a magnification of 10,000, in which a number of carbon nanofibers which are bent to only a small extent are observed. In FIG. 5 showing the electron micrograph of the vapor-grown carbon fibers A observed at a magnification of 50,000, defects such as twists and bends are observed at locations indicated by the arrows. FIG. 6 shows the electron micrograph of the vapor-grown carbon fibers B photographed at a magnification of 10,000, and FIG. 7 shows the electron micrograph of the vapor-grown carbon fibers B observed at a magnification of 50,000. In FIG. 7, defects are observed at locations indicated by the arrows in the same manner as in FIG. 5. FIG. 8 shows the electron micrograph of the CNT13 photographed at a magnification of 50,000, and FIG. 9 shows the electron micrograph of the CNT13 observed at a magnification of 100,000. The CNT13 showed defects at a short interval in comparison with the vapor-grown carbon fibers A and B, and was bent to a large extent. In the measurement of the length Lx, the distance between the defects was measured. The bending indices of each fiber were calculated by Lx/D at 200 locations using the measurement results, and divided by the number of measurement locations (200) to determine the average bending index. The average bending index of the vapor-grown carbon fibers A was 9.9, the average bending index of the vapor-grown carbon fibers B was 6.8, the average bending index of the CNT13 was 2.2, and the average bending index of the CNT120 was 2.7. The average diameter of the vapor-grown carbon fibers A was 87 nm, the average diameter of the vapor-grown carbon fibers B was 156 nm, the average diameter of the CNT13 was 13 nm, and the average diameter of the CNT120 was 120 nm. FIG. 10 shows a graph of the distribution of the degree of bending of each fiber in which the horizontal axis indicates the bending index and the vertical axis indicates the frequency (%).

3. Measurement of Elongation at Break (%)

A specimen prepared by cutting each sample in the shape of a dumbbell in accordance with JIS-K6251-1993 was subjected to a tensile fracture test at a temperature of 23±2° C. and a tensile rate of 500 mm/min using a tensile tester manufactured by Toyo Seiki Seisaku-sho, Ltd. to measure the elongation at break (%). The results are shown in Tables 1 and 2 and FIG. 11.

4. Measurement of Dynamic Modulus of Elasticity (MPa)

A specimen prepared by cutting each sample in the shape of a strip (40×1×5 (width) mm) was subjected to a dynamic viscoelasticity test using a dynamic viscoelasticity tester DMS6100 manufactured by SII at a chuck distance of 20 mm, a temperature of 150° C., and a frequency of 10 Hz to measure the dynamic modulus of elasticity (E') at 150° C. The first dynamic modulus of elasticity (E'(L)) in the first direction (roll rotational direction) and the second dynamic modulus of elasticity (E'(T)) in the direction (width direction of the sheet) perpendicular to the first direction were measured, and the orientation ratio (E'(L)/E'(T)) of the first dynamic modulus of elasticity (E'(L)) to the second dynamic modulus of elasticity (E'(T)) was calculated. The results are shown in Tables 1 and 2 and FIG. 11.

5. Measurement Using Pulsed NMR Technique

Each raw material elastomer and each sample were subjected to measurement by the inversion recovery method using the pulsed NMR technique. The measurement was conducted using a "JMN-MU25" manufactured by JEOL, Ltd. The measurement was conducted under conditions of an observing nucleus of $^1H$, a resonance frequency of 25 MHz, and a 90-degree pulse width of 2 microseconds, and a decay curve was determined while changing tau (waiting time after 180-degree pulse) in the pulse sequence (180°-tau-90°) of the inversion recovery method. The sample was measured in a state in which the sample was inserted into a sample tube within an appropriate magnetic field range. The measurement temperature was 150° C. The spin-lattice relaxation times (T1) of the raw material elastomer and the carbon fiber composite material sample were determined by this measurement. The spin-lattice relaxation time (T1) of "NR" used as the raw material was 1040 milliseconds, the spin-lattice relaxation time (T1) of "EPDM" was 501 milliseconds, and the spin-lattice relaxation time (T1) of "E-SBS" was 231 milliseconds. The change rate ((T1'−T1)/T1) of the spin-lattice relaxation time (T1') of the carbon fiber composite material sample with respect to the spin-lattice relaxation time (T1) of the raw material elastomer was determined. The measurement results of the spin-lattice relaxation time (T1') and the T1 change rate (%) of the carbon fiber composite material sample are shown in Tables 1 and 2.

TABLE 1

| | | Example | | | | | | |
|---|---|---|---|---|---|---|---|---|
| | | 1 | 2 | 3 | 4 | 5 | 6 | 7 |
| Raw material elastomer | Type | NR | NR | NR | NR | NR | EPDM | EPDM |
| | T1 (150° C.)(msec) | 1040 | 1040 | 1040 | 1040 | 1040 | 501 | 501 |
| Amount (phr) | Elastomer | 100 | 100 | 100 | 100 | 100 | 100 | 100 |
| | Filler Vapor-grown carbon fiber A | 20 | 30 | 50 | 100 | 150 | 40 | 60 |
| | Vapor-grown carbon fiber B | 0 | 0 | 0 | 0 | 0 | 0 | 0 |
| | CNT13 | 0 | 0 | 0 | 0 | 0 | 0 | 0 |
| | CNT120 | 0 | 0 | 0 | 0 | 0 | 0 | 0 |
| | HAF | 0 | 0 | 0 | 0 | 0 | 0 | 0 |
| Average bending index of filler | | 9.9 | 9.9 | 9.9 | 9.9 | 9.9 | 9.9 | 9.9 |
| Filling rate of filler (wt %) | | 16.7% | 23.1% | 33.3% | 50.0% | 60.0% | 28.6% | 37.5% |
| Sample preparation method | | (A) | (A) | (A) | (A) | (A) | (A) | (A) |
| Crosslinking | | Cross-linked | Cross-linked | Cross-linked | Cross-linked | Cross-linked | Cross-linked | Cross-linked |
| Properties | Elongation at break (%) | 440 | 450 | 410 | 244 | 140 | 295 | 293 |
| | E'/150° C. (MPa) | 35 | 45 | 62 | 195 | 330 | 30 | 45.5 |
| | T1 (150° C.)(msec) | 998 | 1000 | 1005 | 956 | 934 | 491 | 501 |
| | T1 change rate (%) | −4.0% | −3.8% | −3.4% | −8.1% | −10.2% | −2.0% | 0.0% |
| | E' orientation ratio | 1.12 | 1.18 | 1.21 | 1.22 | 1.35 | 1.13 | 1.19 |

| | | Example | | | | | |
|---|---|---|---|---|---|---|---|
| | | 8 | 9 | 10 | 11 | 12 | 13 |
| Raw material elastomer | Type | EPDM | EPDM | EPDM | E-SBS | NR | NR |
| | T1 (150° C.)(msec) | 501 | 501 | 501 | 231 | 1040 | 1040 |
| Amount (phr) | Elastomer | 100 | 100 | 100 | 100 | 100 | 100 |
| | Filler Vapor-grown carbon fiber A | 80 | 100 | 120 | 100 | 0 | 100 |
| | Vapor-grown carbon fiber B | 0 | 0 | 0 | 0 | 100 | 0 |
| | CNT13 | 0 | 0 | 0 | 0 | 0 | 0 |
| | CNT120 | 0 | 0 | 0 | 0 | 0 | 0 |
| | HAF | 0 | 0 | 0 | 0 | 0 | 0 |
| Average bending index of filler | | 9.9 | 9.9 | 9.9 | 9.9 | 6.8 | 9.9 |
| Filling rate of filler (wt %) | | 44.4% | 50.0% | 54.5% | 50.0% | 50.0% | 50.0% |
| Sample preparation method | | (A) | (A) | (A) | (A) | (A) | (B) |
| Crosslinking | | Cross-linked | Cross-linked | Cross-linked | UnCross-linked | Cross-linked | Cross-linked |
| Properties | Elongation at break (%) | 232 | 213 | 208 | 190 | 233 | 160 |
| | E'/150° C. (MPa) | 66.4 | 111 | 127 | 165 | 33.5 | 411 |
| | T1 (150° C.)(msec) | 474 | 480 | 471 | 225 | 931 | 928 |
| | T1 change rate (%) | −5.4% | −4.2% | −6.0% | −2.6% | −10.5% | −10.8% |
| | E' orientation ratio | 1.22 | 1.25 | 1.12 | 1.44 | 1.37 | 4.00 |

TABLE 2

| | | Comparative Example | | | | | | | |
|---|---|---|---|---|---|---|---|---|---|
| | | 1 | 2 | 3 | 4 | 5 | 6 | 7 | 8 |
| Raw material elastomer | Type | NR | NR | NR | NR | NR | NR | NR | NR |
| | T1 (150° C.)(msec) | 1040 | 1040 | 1040 | 1040 | 1040 | 1040 | 1040 | 1040 |
| Amount (phr) | Elastomer | 100 | 100 | 100 | 100 | 100 | 100 | 100 | 100 |
| | Filler Vapor-grown carbon fiber A | 10 | 200 | 0 | 0 | 0 | 0 | 0 | 0 |
| | Vapor-grown carbon fiber B | 0 | 0 | 0 | 0 | 0 | 0 | 0 | 0 |
| | CNT13 | 0 | 0 | 20 | 40 | 60 | 0 | 0 | 0 |
| | CNT120 | 0 | 0 | 0 | 0 | 0 | 20 | 40 | 60 |
| | HAF | 0 | 0 | 0 | 0 | 0 | 0 | 0 | 0 |
| | CF | 0 | 0 | 0 | 0 | 0 | 0 | 0 | 0 |
| Average bending index of filler | | 9.9 | 9.9 | 2.2 | 2.2 | 2.2 | 2.7 | 2.7 | 2.7 |
| Filling rate of filler (wt %) | | 9.1% | 66.7% | 16.7% | 28.6% | 37.5% | 16.7% | 28.6% | 37.5% |
| Sample preparation method | | (A) | (A) | (A) | (A) | (A) | (A) | (A) | (A) |
| Crosslinking | | Cross-linked | Cross-linked | Cross-linked | Cross-linked | Cross-linked | Cross-linked | Cross-linked | Cross-linked |
| Properties | Elongation at break (%) | 420 | 20 | 147 | 125 | 114 | 218 | 148 | 89 |
| | E'/150° C. (MPa) | 20 | 620 | 26.4 | 71.5 | 151 | 4.5 | 12 | 24 |
| | T1 (150° C.)(msec) | 1065 | 862 | 827 | 702 | 592 | 850 | 780 | 500 |
| | T1 change rate (%) | 2.4% | −17.1% | −20.5% | −32.5% | −43.1% | −18.3% | −25.0% | −51.9% |
| | E' orientation ratio | 1.18 | 1.48 | 1.11 | 1.15 | 1.24 | 1.27 | 1.30 | 1.37 |

TABLE 2-continued

|  |  | Comparative Example | | | | | | |
| --- | --- | --- | --- | --- | --- | --- | --- | --- |
|  |  | 9 | 10 | 11 | 12 | 13 | 14 | 15 |
| Raw material elastomer | Type | NR | NR | NR | NR | NR | NR | EPDM |
|  | T1 (150° C.)(msec) | 1040 | 1040 | 1040 | 1040 | 1040 | 1040 | 501 |
| Amount (phr) | Elastomer | 100 | 100 | 100 | 100 | 100 | 100 | 100 |
|  | Filler Vapor-grown carbon fiber A | 0 | 0 | 0 | 0 | 0 | 0 | 20 |
|  | Vapor-grown carbon fiber B | 0 | 0 | 0 | 0 | 0 | 0 | 0 |
|  | CNT13 | 0 | 0 | 0 | 0 | 0 | 0 | 0 |
|  | CNT120 | 0 | 0 | 0 | 0 | 0 | 0 | 0 |
|  | HAF | 20 | 40 | 60 | 0 | 0 | 0 | 0 |
|  | CF | 0 | 0 | 0 | 20 | 40 | 60 | 0 |
| Average bending index of filler | | — | — | — | 6.5 | 6.5 | 6.5 | 9.9 |
| Filling rate of filler (wt %) | | 16.7% | 28.6% | 37.5% | 16.7% | 28.6% | 37.5% | 16.7% |
| Sample preparation method | | (A) | (A) | (A) | (A) | (A) | (A) | (A) |
| Crosslinking | | Cross-linked | Cross-linked | Cross-linked | Cross-linked | Cross-linked | Cross-linked | Cross-linked |
| Properties | Elongation at break (%) | 259 | 244 | 192 | 439 | 418 | 290 | 280 |
|  | E'/150° C. (MPa) | 4.1 | 8.1 | 15 | 2.6 | 4.2 | 9.6 | 11.6 |
|  | T1 (150° C.)(msec) | 1000 | 946 | 922 | 1002 | 991 | 980 | 519 |
|  | T1 change rate (%) | −3.8% | −9.0% | −11.3% | −3.7% | −4.7% | −5.8% | 3.6% |
|  | E' orientation ratio | 1.11 | 1.12 | 1.19 | 1.25 | 1.32 | 1.35 | 1.14 |

As a result of electron microscope observation, it was found that the vapor-grown carbon fibers A and B had a relatively long distance between the adjacent bent portions (defects) (length Lx of linear portion), and the CNT13 had a short distance between the adjacent bent portions (defects) (length Lx of linear portion). As shown in FIG. 10, it was found that the vapor-grown carbon fibers A and B had a long linear portion and were bent to a small extent in comparison with the CNT13 and the CNT120. As shown in Tables 1 and 2, the CNT13 and the CNT120 had an average bending index of less than 5. This indicates that the CNT13 and the CNT120 had a large number of bent portions in comparison with the vapor-grown carbon fibers A and B.

Figure 11:
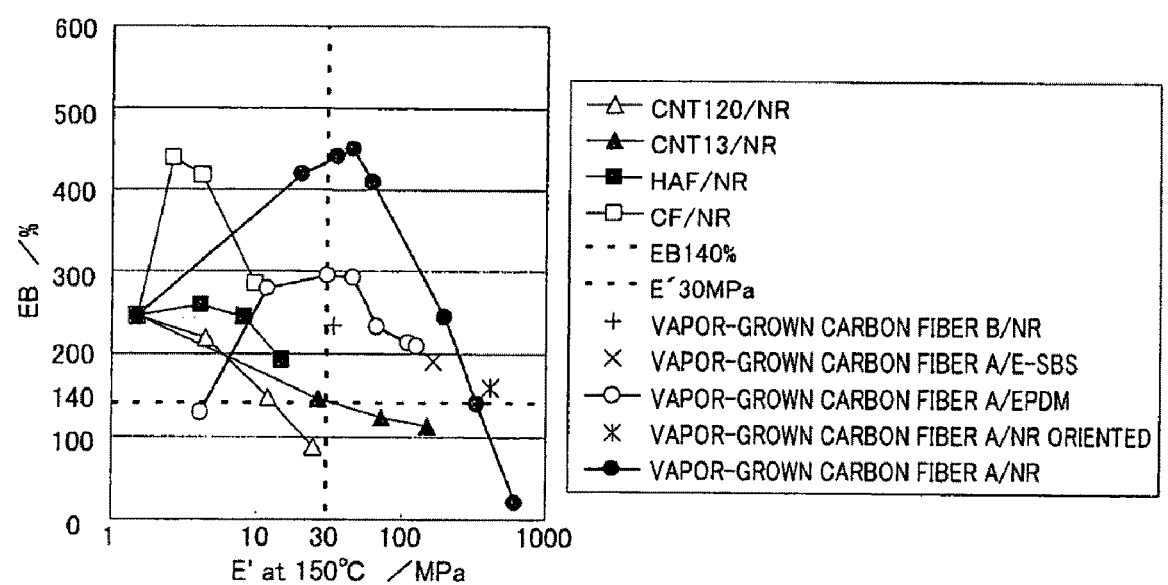
FIG. 11 is a line graph showing the relationship between elongation at break and dynamic modulus of elasticity.

As shown in Tables 1 and 2 and FIG. 11, the dynamic modulus of elasticity and the elongation at break obtained in Examples 1 to 13 using the vapor-grown carbon fibers A and B having a high bending index were higher than those of Comparative Examples 3 to 14 using other fillers. In Comparative Examples 3 to 14, the dynamic modulus of elasticity increased and the elongation at break gradually decreased as the amount of filler was increased. A highly rigid and flexible sample having a dynamic modulus of elasticity (E') at 150° C. of 30 MPa or more and an elongation at break (EB) of 140% or more was not obtained. As is clear from Examples 1 to 13 and Comparative Examples 1 and 2, it was found that a carbon fiber composite material having a dynamic modulus of elasticity (E') at 150° C. of 30 MPa or more and an elongation at break (EB) of 140% or more can be obtained when the filling rate of the vapor-grown carbon fibers in the carbon fiber composite material is 15 to 60 wt %. As shown in Table 1, it was found that the carbon fiber composite materials of Examples 1 to 13 had a T1 change rate (%) of ±15% or less. This indicates that the elastomer maintained flexibility.

The above results confirmed that the carbon fiber composite material according to the invention exhibited high flexibility while exhibiting high rigidity.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A carbon fiber composite material having an elastomer and vapor-grown carbon fibers dispersed in the elastomer,
   the vapor-grown carbon fibers being rigid fibers having an average diameter of 20 to 200 nm, an average length of 5 to 20 micrometers, and an average value of bending indices defined by the following expression (1) of 5 to 15, $$\text{Bending index} = Lx \div D \quad (1)$$

Lx: length of linear portion of the vapor-grown carbon fiber, and
   D: diameter of the vapor-grown carbon fiber, and
   the carbon fiber composite material having a dynamic modulus of elasticity (E') at 150° C. of 30 MPa or more and an elongation at break (EB) of 140% or more,
   wherein an amount of the vapor-grown carbon fibers in the carbon fiber composite material is 15 to 60 wt %.

2. The carbon fiber composite material as defined in claim 1,
   wherein the elastomer has a molecular weight of 5000 to 5,000,000; and
   wherein a network component of the elastomer in an uncrosslinked form has a spin-spin relaxation time (T2n), measured at 30° C. by a Hahn-echo method using a pulsed nuclear magnetic resonance (NMR) technique, of 100 to 3000 microseconds.

3. The carbon fiber composite material as defined in claim 1,
   wherein the dynamic modulus of elasticity (E') of a sheet of the carbon fiber composite material extruded from a mixer in a first direction includes a first dynamic modulus of elasticity (E'(L)) in the first direction and a second dynamic modulus of elasticity (E'(T)) in a direction which is perpendicular to the first direction and is a width direction of the carbon fiber composite material; and
   wherein an orientation ratio (E'(L)/E'(T)) of the first dynamic modulus of elasticity (E'(L)) to the second dynamic modulus of elasticity (E'(T)) is 2 or less.

4. A carbon fiber composite material having an elastomer and vapor-grown carbon fibers dispersed in the elastomer, the vapor-grown carbon fibers having an average diameter of 20 to 200 nm and an average length of 5 to 20 micrometers, a change rate of a spin-lattice relaxation time (T$\mathbf{1}'$) of the carbon fiber composite material with respect to a spin-lattice relaxation time (T$\mathbf{1}$) of the elastomer, measured at 150° C. by an inversion recovery method using a pulsed nuclear magnetic resonance (NMR) technique, being ±15% or less, and the carbon fiber composite material having a dynamic modulus of elasticity (E') at 150° C. of 30 MPa or more and an elongation at break (EB) of 140% or more, wherein an amount of the vapor-grown carbon fibers in the carbon fiber composite material is 15 to 60 wt %.

5. The carbon fiber composite material as defined in claim 4, wherein the elastomer has a molecular weight of 5000 to 5,000,000; and wherein a network component of the elastomer in an uncrosslinked form has a spin-spin relaxation time (T$\mathbf{2}n$), measured at 30° C. by a Hahn-echo method using a pulsed nuclear magnetic resonance (NMR) technique, of 100 to 3000 microseconds.

6. The carbon fiber composite material as defined in claim 4, wherein the dynamic modulus of elasticity (E') of a sheet of the carbon fiber composite material extruded from a mixer in a first direction includes a first dynamic modulus of elasticity (E'(L)) in the first direction and a second dynamic modulus of elasticity (E'(T)) in a direction which is perpendicular to the first direction and is a width direction of the carbon fiber composite material; and wherein an orientation ratio (E'(L)/E'(T)) of the first dynamic modulus of elasticity (E'(L)) to the second dynamic modulus of elasticity (E'(T)) is 2 or less.

\* \* \* \* \*

UNITED STATES PATENT AND TRADEMARK OFFICE
CERTIFICATE OF CORRECTION

PATENT NO.       : 8,329,293 B2  
APPLICATION NO.  : 11/785875  
DATED            : December 11, 2012  
INVENTOR(S)      : Noguchi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Twenty-eighth Day of October, 2014

Michelle K. Lee
*Deputy Director of the United States Patent and Trademark Office*